United States Patent [19]

Tomioka et al.

[11] 4,416,555

[45] Nov. 22, 1983

[54] BEARING SYSTEM FOR VERTICAL TYPE ROTARY MACHINE

[75] Inventors: Shunzo Tomioka; Kinpei Okano; Masanori Matsuo; Akira Hasegawa; Akira Kitamura, all of Hitachi, Japan

[73] Assignee: Hitachi, Ltd., Tokyo, Japan

[21] Appl. No.: 306,869

[22] Filed: Sep. 29, 1981

[30] Foreign Application Priority Data

Sep. 30, 1980 [JP] Japan .................................. 55-135287

[51] Int. Cl.³ ............................................ F16C 17/02
[52] U.S. Cl. .................................... 384/415; 384/398
[58] Field of Search ............... 384/415, 398, 397, 399, 384/118

[56] References Cited

U.S. PATENT DOCUMENTS 2,905,510 9/1959 Gardiner ............................. 384/415
3,664,461 5/1972 Leffers et al. ....................... 384/415
3,848,702 11/1974 Bergman ............................. 384/415

*Primary Examiner*—Lenard A. Footland

*Attorney, Agent, or Firm*—Antonelli, Terry & Wands

[57] ABSTRACT

A bearing system for a vertical type rotary machine including a vertically extending rotor shaft including a guide bearing immersed in oil in an oil tank disposed around the rotor shaft. The guide bearing has a cylindrical bearing surface juxtaposed against the peripheral surface of the rotor shaft and a plurality of axially extending oil grooves formed in the cylindrical bearing surface. An oil guide member is mounted on a lower end surface of the guide bearing adjacent to the open lower axial end of each oil groove. Each oil guide member has a guide surface facing a flow of oil in the oil tank induced by the rotation of the rotor shaft for guiding the oil flow into the associated oil groove. The guide surface has a lower edge thereof remote from the lower end surface of the guide bearing, which is advanced toward the direction of oil flow with respect to an upper edge of the guide surface adjacent to the lower end surface of the guide bearing. The guide surface extends radially outwardly beyond the bottom surface of the associated oil groove.

18 Claims, 6 Drawing Figures

BEARING SYSTEM FOR VERTICAL TYPE ROTARY MACHINE

BACKGROUND OF THE INVENTION

1. Field of the Invention

The present invention relates to a bearing system for a vertical type rotary machine including a vertically extending rotor shaft.

2. Description of the Prior Art

A bearing system of the aforementioned type of the prior art includes an oil tank, disposed around the rotor shaft and containing lubricating oil, and a guide bearing disposed around the rotor shaft in concentric relation thereto for guiding the rotor shaft. The guide bearing includes upper and lower end surfaces and a cylindrical bearing surface extending therebetween and juxtaposed against the periphery of the rotor shaft. The bearing surface has a lower peripheral portion thereof dipped in the lubricating oil in the oil tank. A plurality of axially extending oil grooves are formed in the cylindrical bearing surface. Each of the oil grooves has opposite other axial ends thereof opening into the upper and lower end surfaces, respectively, of the guide bearing, a bottom surface, leading and trailing side surfaces with respect to the direction of rotation of the rotor shaft.

The oil grooves each have associated therewith one oil guide member which is secured to the lower end surface of the guide bearing adjacent to the trailing side surface of the associated oil groove. Each of the oil guide members is provided with a guide surface facing the flow of lubricating oil in the oil tank induced by the rotation of the rotor shaft for introducing the lubricating oil into the associated oil groove. The guide surface extends in a plane including the axis of the rotor shaft and is coextensive with the trailing side surface of the oil groove, and has the same radial width as the trailing side surface of the oil groove.

With the arrangement, when the flow of lubricating oil in the above noted oil tank induced by the rotation of the rotary shaft impinges against the guide surface of each oil guide member, the majority of the lubricating oil escapes around a lower edge and a radially outward edge of the guide surface, and the volume of the lubricating oil introduced into the oil groove is very small thereby decreasing the lubricating and cooling functions by the oil.

When the rotor shaft rotates, the lubricating oil in the oil tank would be agitated to engulf air into the oil so that fine air bubbles are formed in the oil. As the flow of the oil, induced by the rotation of the rotor shaft, impinges against the guide surface of each oil guide member and stagnates at the guide surface, the air bubbles entrained by the oil flow are collected at the stagnating point and are joined to each other so that the fine bubbles grow into large air bubbles. The large air bubbles move upwardly in the oil groove and cause discontinuity in an oil film formed between the rotor shaft and the guide bearing, thereby causing seizure to occur.

SUMMARY OF THE INVENTION

An object of the present invention is to provide a bearing system for a vertical type rotary machine capable of increasing the volume of lubricating oil introduced into the oil grooves and restraining the growth of air bubbles.

According to the present invention, there is provided a bearing system for a vertical type rotary machine including a vertically extending rotor shaft, comprising an oil tank disposed around the rotor shaft and receiving lubricating oil in the oil tank; a guide bearing disposed around the rotor shaft in concentric relation thereto for guiding the rotor shaft, with the guide bearing having upper and lower end surfaces and a cylindrical bearing surface extending therebetween and facing the periphery of the rotor shaft. At least a lower peripheral portion of the bearing surface is dipped in the oil within the oil tank, and the guide bearing includes a plurality of generally axially extending oil grooves formed in the bearing surface. Each of the oil grooves have an axial end thereof opening into the lower end surface of the guide bearing and a bottom surface and leading and trailing side surfaces with respect to the rotational direction of the rotor shaft. A plurality of oil guide members are respectively associated with each of at least some of the oil grooves, with each of the oil guide members being located adjacent to the lower end surface of the guide bearing and adjacent to the trailing side surface of the associated oil groove. Each of the oil guide members have a guide surface facing the direction of flow of the oil within the oil tank accompanied with the rotation of the rotor shaft for introducing the oil into the associated oil grooves. The guide surface includes an upper edge adjacent to the lower surface of the guide bearing and a lower edge remote therefrom, the lower edge being advanced toward the oil flow with respect to the upper edge, and the guide surface extends radially outwardly beyond the bottom surface of the oil grooves.

DETAILED DESCRIPTION OF THE PREFERRED EMBODIMENTS

Figure 1:
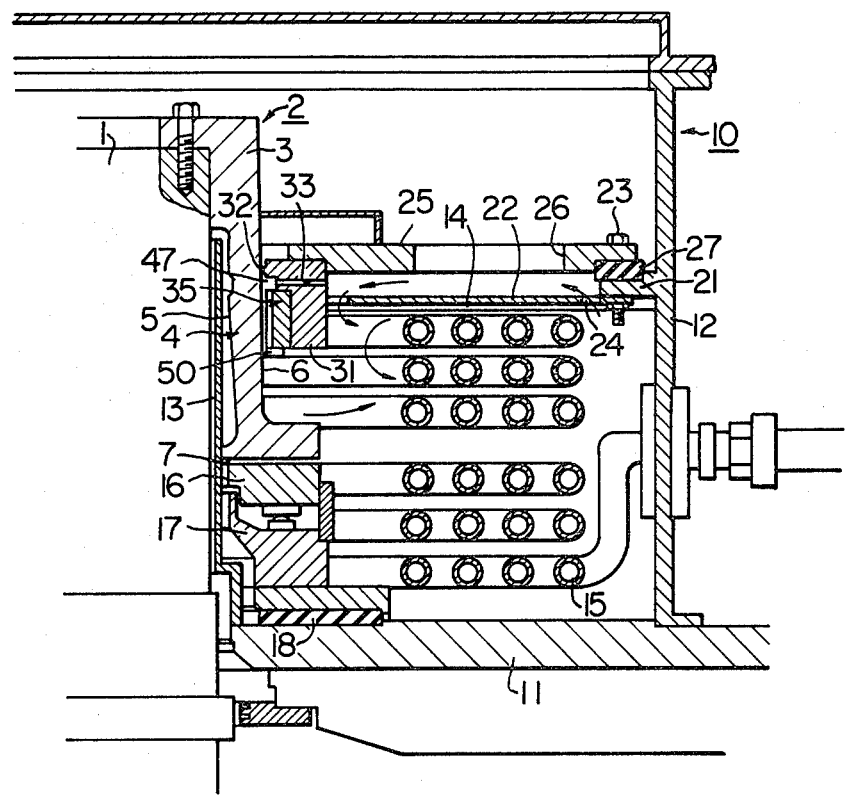
FIG. 1 is a schematic, fragmentary cross-sectional view of a bearing system according to an embodiment of the invention.

Referring to the drawings wherein like reference numerals are used throughout the various views to designate like parts and, more particularly to FIG. 1, a bearing system is applied to an axial end portion of a vertically extending rotor shaft 1 of a vertical type rotary machine, with the rotary machine; including a rotor sleeve generally designated by the reference numeral 2 comprising an annular portion 3 bolted to the rotor shaft 1, and a skirt portion generally designated by the reference numeral 4 depending from the annular portion 3. The skirt portion 4 has an inner peripheral surface 5 spaced from an outer peripheral surface of the rotor shaft 1, an outer peripheral surface 6 concentric with the outer peripheral surface of the rotor shaft 1, and a thrust bearing surface 7.

The bearing system comprises an oil tank generally designated by the reference numeral 10 disposed around the rotor shaft 1 for containing lubricating oil. The oil tank 10 includes an annular base 11, a cylindrical outer wall member 12 secured to the annular base 11, and a cylindrical inner wall member 13 secured to the annular base 11 and extending into a gap between the rotary shaft 1 and the skirt portion 4 of the rotor sleeve 2. The outer wall member 12 and the inner wall member 13 cooperate with the annular base 11 to define an annular space in which the oil is filled up to a level 14. The skirt portion 4 of the rotor sleeve 2 has its lower peripheral portion dipped in the oil in the oil tank 10. Arranged in the oil tank 10 is a nest of cooling tubes 15 through which a cooling fluid flows to cool the oil in the oil tank 10.

A thrust bearing 16 comprising a plurality of segments is placed on the base 11 through a support member 17 and vibration damping member 18 formed of resilient material and is in sliding contact with the thrust bearing surface 7 of the skirt portion 4 for journaling the thrust of the rotor shaft 1.

Figure 2:
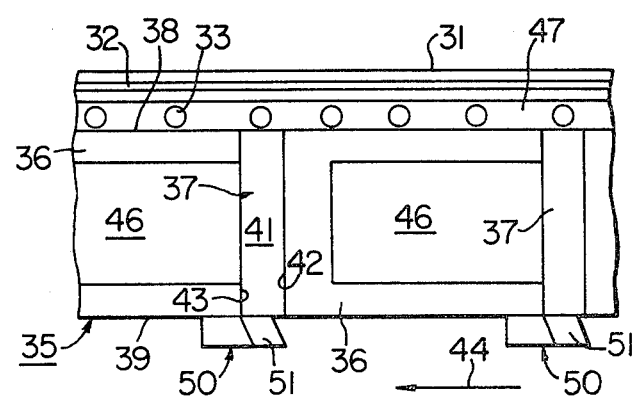
FIG. 2 is a developed view of an assembly of a guide bearing, boss and oil guide members of a bearing system of the present invention.

The outer wall member 12 of the oil tank 10 is formed with an annular ledge 21 which is integral with the inner peripheral surface of the outer wall member 12. An annular baffle plate 22 is located slightly above the oil level 14 and is secured to the underside of the ledge 21 by bolt-nut assemblies 23. The baffle plate 22 is formed with openings 24 extending through a radially outward peripheral portion of the plate 22. An annular stay 25 formed with windows 26 circumferentially spaced from each other is secured by the bolt-nut assemblies 23 to the upper surface of the ledge 21 through a vibration damping member 27 formed of resilient material. An annular boss 31 is secured to a radially inner edge of the stay 25. As shown in FIG. 2, the annular boss 31 includes a sealing annular projection 32, and a plurality of radial openings 33 circumferentially equidistantly spaced from each other, A guide bearing generally designated by the reference numeral 35 is mounted on the boss 31 around the skirt portion 4 in concentric relation to the outer peripheral surface 6 thereof to guide the rotor sleeve 2. The guide bearing 35 includes a cylindrical bearing surface 36 (FIG. 2) juxtaposed against the outer peripheral surface 6 of the skirt portion 4. The cylindrical bearing surface 36 has a lower peripheral portion thereof dipped in the oil within the oil tank 10. As can be clearly seen in FIG. 2, the guide bearing 35 has formed in the bearing surface 36 a plurality of axially extending oil grooves generally designaed by the reference numeral 37 circumferentially equi-distantly spaced from each other. The oil grooves 37 each have respective axial ends opening into an upper end surface 38 and a lower end surface 39 of the guide bearing 36. Each of the oil grooves 37 includes a bottom surface 41, and leading and trailing side surfaces 42 and 43 with respect to the direction of rotation of the rotor shaft 1 indicated by an arrow 44. The cylindrical bearing surface 36 is formed with rectangular recesses or pockets 46 each have one side thereof communicating with one of the oil grooves 37. When the guide bearing 35 is attached to the annular boss 31, the upper end surface 38 of the guide bearing 35 cooperates with the boss 31 to define therebetween an annular channel 47.

As shown in FIG. 2, an oil guide member generally designated by the reference numeral 50 is associated with each of the oil grooves 37. As can be clearly seen in FIG. 3, each oil guide member 50 is fixedly mounted on the lower end surface 39 of the guide bearing 35 adjacent to the trailing side surface 43 of the oil groove 37. Each oil guide member 50 is provided with a guide surface 51 facing a direction 52 of flow of the oil within the oil tank 10 induced by the rotation of the rotor shaft 1 for introducing the oil into the associated oil groove 37.

Figure 3:
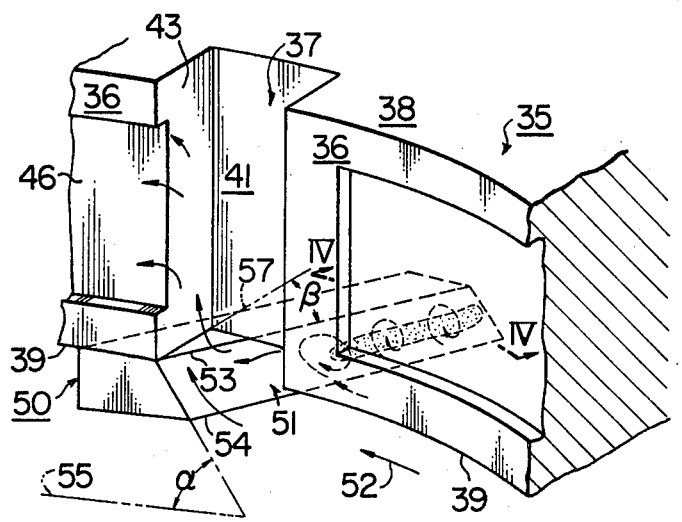
FIG. 3 is a fragmentary perspective view of the bearing system of the present invention showing the positional relation between the oil groove and the oil guide member.

As shown most clearly in FIG. 3, the guide surface 51 has an upper edge 53 adjacent the lower end surface 39 of the guide bearing 35, and a lower edge 54 remote from the lower end surface 39. The lower edge 54 is advanced toward the direction 52 of flow of the oil with respect to the upper edge 53, and a planar surface extends between the upper edge 53 and the lower edge 54, so that an angle $\alpha$ is formed between the guide surface 51 and a plane 55 perpendicular to the axis of the rotary shaft 1. The angle $\alpha$ is in the range between approximately 30° and 80°, preferably 45°.

Additionally, as shown in FIG. 3, the guide surface 51 extends radially outwardly beyond the bottom surface 41 of each oil groove 37 and is inclined toward the direction 52 of the flow of oil at angle $\beta$ with respect to a plane 57 substantially coincident with the trailing side surface 43 and including the axis of the rotor shaft 1. The angle $\beta$ is in the range between about 0° and 60°, preferably 22.5°.

As the rotor shaft 1 is rotated and the rotor sleeve 2 secured thereto rotates in the direction of the arrow 44, the oil in the oil tank 10 in contact with the skirt portion 4 of the rotor sleeve 2 flows in a direction indicated by an arrow 52 in FIG. 3 which is the same as the direction of rotation of the rotor sleeve 2. In FIG. 3, as the oil flow 52 impinges against the guide surface 51 of the oil guide member 50, the oil flow 52 is guided by the guide surface 51 and introduced into the associated oil groove 37. A portion of the oil introduced into each oil groove 37 flows into the pockets 46 to lubricate the bearing surface 36 of the guide bearing 35. The rest of the oil introduced into the oil groove 37 flows into the annular channel 47 and is returned to the oil tank 10 through the radial openings 33. The oil in the oil tank 10 is thus circulated.

Since the guide surface 51 extends radially outwardly beyond the bottom surface 41 of the oil groove 37 and is inclined at the angle $\alpha$ with respect to the plane 55 perpendicular to the axis of the rotor shaft 1, the guide surface 51 scoops the oil and effectively guides the same into the oil groove 37, to thereby increase the volume of the oil introduced into the oil groove 37. The inclination of the guide surface 51 at the angle $\beta$ causes the scooping action of the guide surface 51 to be increased to further increase the volume of the oil introduced into the oil groove 37.

With an increase in the number of revolutions of the rotor shaft 1, the rotation of the rotor sleeve 2 causes the oil in the oil tank 10 to be agitated and causes the surface of the oil to become choppy. The baffle plate 22 prevents the oil from being splashed through the windows 26 formed in the stay 25. The choppy oil flows through the openings 24 in the baffle plate 22 and along the baffle plate 22, and is thus circulated. As the oil in the oil tank 10 is agitated by the rotation of the rotor sleeve 2, the air in contact with the oil surface is engulfed in the oil, to form fine air bubbles in the oil. The flow 52 of the oil containing fine air bubbles impinges against the guide surface 51 of the oil guide member 50. However, since the guide surface 51 is inclined at the angle of $\alpha$, the oil flow 52 impinging against a portion of the guide surface 51 located radially inwardly of the bottom surface 41 of the oil groove 37 is smoothly guided by the radially inward portion of the guide surface 51 and the oil flow does not stagnate at the radially inward portion of the guide surface 51. Thus, the air bubbles entrained by the oil flow 52 do not grow into large sizes at the radially inward portion of the guide surface 51 and flow into the oil groove 37 while being still small in size. Generally, fine air bubbles are smaller in diameter than the thickness of an oil film formed between the outer peripheral surface 6 of the skirt portion 4 and the bearing surface 36 of the guide bearing 35. Thus, the air bubbles flowing from the oil groove 37 into the pockets 46 cause to discontinuity in the oil film.

Figure 4:
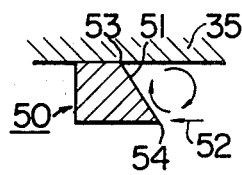
FIG. 4 is a cross sectional detail view taken along the line IV—IV in FIG. 3.

Referring to FIGS. 3 and 4, the oil flow 52 impinging against a portion of the guide surface 51 located radially outwardly of the bottom surface 41 of the oil groove 37 flows in swirling motion at a corner defined by the lower end surface 39 of the guide bearing 35 and the guide surface 52. Since the radially inward oil flow has a higher velocity than the radially outward oil flow, the swirling flow of oil at the corner is in the form of a spiral having such velocity distribution that the swirling flow of the radially inward side has a velocity higher than the swirling flow of the radially outward side. Because the air bubbles are light in weight, they are collected in the center of the spiral flow of oil, are moved toward the radially outward side of lower velocity, and are released from the radially outward end of the guide surface 51.

From the foregoing description, it will be appreciated that the guide surface 51 is capable of increasing the amount of oil introduced into the oil groove 37 while restraining the growth of air bubbles, to make effective the lubricating action and the cooling action of the lubricating oil, thereby increasing the load bearing ability of the guide bearing 35.

Figure 5:
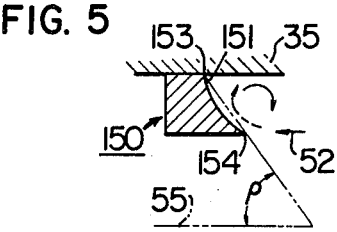
FIG. 5 is a cross sectional view similar to FIG. 4 of a modification of the oil guide member.

Although, in the embodiment shown in FIGS. 1-4, the guide surface 51 has been shown and described as being a planar surface, as shown in FIG. 5 a guide surface 151 of an oil guide member generally designated by the reference numeral 150 may be a concavely curved surface extending between an upper edge 153 and a lower edge 154 of the guide surface. In the modification shown in FIG. 5, an angle $\rho$ formed between the straight line connecting the upper edge 153 and the lower edge 154 of the guide surface 151 and the plane 55 perpendicular to the axis of the rotor shaft 1 is in the range between about 30° and 80°, preferably 45°. The concavely curved guide surace 151 does further smoothly guide the oil flow 52 to ensure that the growth of the air bubbles is restrained.

Figure 6:
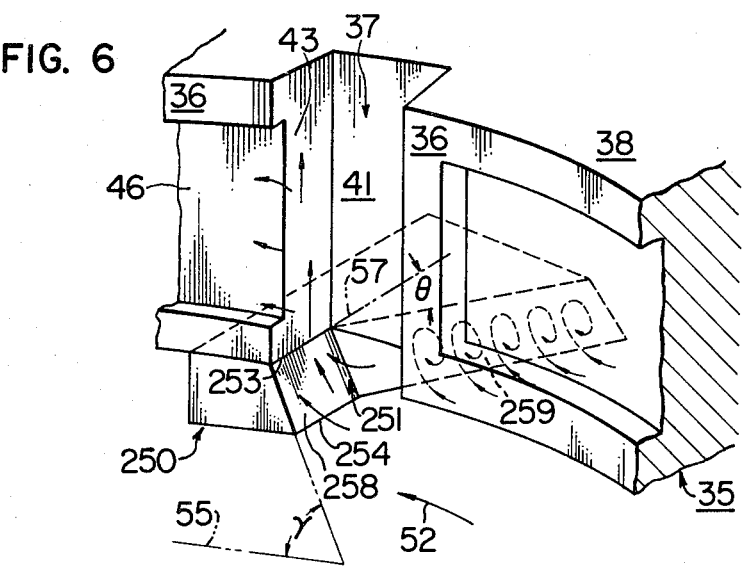
FIG. 6 is a perspective view similar to FIG. 3 of another embodiment of the invention.

The embodiment shown in FIG. 6 includes an oil guide member generally designated by the reference numeral 250 having a guide surface 251 comprising a radially inward portion 258 and a radially outward portion 259 from the bottom surface 41 of each oil groove 37 formed in the bearing surface 36 of the guide bearing 35. As in the embodiment shown in FIGS. 1-4, the guide surface 251 comprising the radially inward portion 258 and the radially outward portion 259 has a lower edge 254 advanced toward the direction 52 of flow of the oil with respect to an upper edge 253 thereof, and a planar surface extends between the upper edge 253 and the lower edge 254, so that an angle $\gamma$ equal to the angle $\alpha$ of the embodiment shown in FIGS. 1-4 is formed between the guide surface 251 and the plane 55 perpendicular to the axis of the rotor shaft 1 (See FIG. 1).

The upper edge 253 of the radially inward portion 254 of the guide surface 251 is aligned with the trailing side surface 43 of the oil groove 37. The radially outward portion 259 of the guide surface 251 is inclined at an angle $\theta$ equal to the angle $\beta$ of the embodiment shown in FIGS. 1-4 toward the direction 52 of flow of the oil with respect to the plane 57 including the axis of the rotor shaft 1 (See FIG. 1).

The embodiment shown in FIG. 6 operates substantially in the same fashion as the embodiment shown in FIGS. 1-4. However, since the upper edge 253 of the radially inward portion 258 of the guide surface 251 is in alignment with the trailing side surface 43 of the oil groove 37, the oil flow guided into the oil groove 37 by the radially inward portion 258 is not disturbed, but flows smoothly to ensure that the growth of the air bubbles is further restrained.

In the embodiments shown and described hereinabove, the guide bearing 35 is juxtaposed against the rotor sleeve 2. The invention is not limited to this specific arrangement of the guide bearing 35 and the guide bearing 35 may be in direct juxtaposed relation to the rotor shaft 1. In addition, although one oil guide member 50, 150, 250 has been described as being associated with each of the oil grooves 37, one oil guide member may be associated with each of some of the oil grooves. It goes without saying that the bearing system according to the invention is applicable to an intermediate portion of the rotor shaft between its opposite ends.

What we claim is:

1. A bearing system for a vertical type rotary machine including a vertically extending rotor shaft, comprising:

an oil tank disposed around said rotor shaft and receiving lubricating oil in said oil tank;

a guide bearing disposed around said rotor shaft in a concentric relation thereto for guiding said rotor shaft, said guide bearing having upper and lower end surfaces and a cylindrical bearing surface extending therebetween and facing the periphery of said rotor shaft with at least a lower peripheral portion of said bearing surface dipped in the oil within said oil tank, said guide bearing including a plurality of generally axially extending oil grooves formed in said bearing surface, each of said oil grooves having axial one end thereof opening into said lower end surface of said guide bearing and having a bottom surface and leading and trailing side surfaces with respect to the rotational direction of said rotor shaft;

a plurality of oil guide members with one associated with each of at least some of said oil grooves, each of said oil guide members being located adjacent to said lower end surface of said guide bearing and adjacent to said trailing side surface of the associated oil groove, each of said oil guide members having a guide surface facing the direction of flow of the oil within said oil tank accompanied with the rotation of said rotor shaft for introducing the oil into the associated oil groove; and said guide surface having an upper edge adjacent to said lower surface of said guide bearing and a lower edge remote therefrom, said lower edge being advanced toward the oil flow with respect to said upper edge, and said guide surface extending radially outwardly beyond said bottom surface of said oil groove.

2. A bearing system defined in claim 1, wherein at least a portion of said guide surface which is located radially outwardly from said bottom surface of said oil groove is inclined toward the oil flow with respect to a plane including the axis of said rotor shaft.

3. A bearing system defined in claim 2, wherein said upper edge of said radially outward portion of said guide surface is aligned with said trailing side surface of said oil groove.

4. A bearing system defined in claim 2, wherein the entire guide surface is inclined toward the oil flow with respect to the plane including the axis of said rotor shaft.

5. A bearing system defined in one of claims 2, 3 or 4, wherein an angle of inclination is between approximately 0° and 60°.

6. A bearing system defined in one of claims 1, 2, 3 or 4, wherein a planar surface extends between said upper and lower edges of said guide surface.

7. A bearing system defined in claim 6, wherein an angle between said guide surface and a plane perpendicular to the axis of said rotor shaft is between approximately 30° and 80°.

8. A bearing system defined in one of claims 1, 2, 3, or 4, wherein a concavely curved surface extends between said upper and lower edges of said guide surface.

9. A bearing system defined in claim 8, wherein an angle between a line passing through said upper and lower edges of said guide surface and plane perpendicular to the axis of said rotor shaft is between approximately 30° and 80°.

10. A bearing system for a vertical type rotary machine including a vertically extending rotor shaft and a rotor sleeve having an annular portion secured to said rotor shaft and a skirt portion depending from said annular portion, said skirt portion having an outer peripheral surface concentric with said rotor shaft, said bearing system comprising:

an oil tank disposed around said rotor shaft and receiving lubricating oil in said oil tank, said skirt portion having at least a lower peripheral portion thereof dipped in the oil within said oil tank;

a guide bearing disposed around said skirt portion in a concentric relation to the outer peripheral surface thereof for guiding said rotor sleeve, said guide bearing having upper and lower end surfaces and a cylindrical bearing suface extending therebetween and facing the outer peripheral surface of said skirt portion with at least a lower peripheral portion of said bearing surface dipped in the oil within said oil tank, said guide bearing including a plurality of generally axially extending oil grooves formed in said bearing surface, each of said oil grooves having axial one end thereof opening into said lower end surface of said guide bearing and having a bottom surface and leading and trailing side surfaces with respect to the rotational direction of said rotor shaft;

a plurality of oil guide members with one associated with each of at least some of said oil grooves, each of said oil guide members being located adjacent to said lower end surface of said guide bearing and adjacent to said trailing side surface of the associated oil groove, each of said oil guide members having a guide surface facing the direction of flow of the oil within said oil tank accompanied with the rotation of said rotor shaft for introducing the oil into the associated oil groove; and said guide surface having an upper edge adjacent to said lower end surface of said guide bearing and lower edge remote therefrom, said lower edge being advanced toward the oil flow with respect to said upper edge, and said guide surface extending radially outwardly beyond said bottom surface of said oil groove.

11. A bearing system defined in claim 10, wherein at least a portion of said guide surface which is located radially outwardly from said bottom surface of said oil groove is inclined toward the oil flow with respect to a plane including the axis of said rotor shaft.

12. A bearing system defined in claim 11, wherein said upper edge of said radially outward portion of said guide surface is aligned with said trailing side surface of said oil groove.

13. A bearing system defined in claim 11, wherein the entire guide surface is inclined toward the oil flow with respect to the plane including the axis of said rotor shaft.

14. A bearing system defined in one of claims 11, 12 or 13, wherein the angle of inclination is between approximately 0° and 60°.

15. A bearing system defined in one of claims 10, 11, 12 or 13, wherein a planar surface extends between said upper and lower edges of said guide surface.

16. A bearing system defined in claim 15, wherein an angle between said guide surface and a plane perpendicular to the axis of said rotor shaft is between approximately 30° and 80°.

17. A bearing system defined in one of claims 10, 11, 12 or 13, wherein a concavely curved surface extends between said upper and lower edges of said guide surface.

18. A bearing system defined in claim 17, wherein an angle between a line passing through said upper and lower edges of said guide surface and a plane perpendicular to the axis of said rotor shaft is between approximately 30° and 80°.

* * * * *